United States Patent
Anagnostou

(10) Patent No.: US 7,056,185 B1
(45) Date of Patent: Jun. 6, 2006

(54) SINGLE AXLE WIRELESS REMOTE CONTROLLED ROVER WITH OMNIDIRECTIONAL WHEELS

(76) Inventor: Thomas Anagnostou, 32 Cheswold Blvd. 1B, Newark, DE (US) 19713

( * ) Notice: Subject to any disclaimer, the term of this patent is extended or adjusted under 35 U.S.C. 154(b) by 0 days.

(21) Appl. No.: 10/958,005

(22) Filed: Oct. 4, 2004

(51) Int. Cl.
*B62D 61/00* (2006.01)

(52) U.S. Cl. .................... 446/456; 180/218; 180/7.1; 180/167; 180/6.5; 446/462

(58) Field of Classification Search ............. 180/218, 180/7.1, 7.2, 167, 6.2, 6.5; 446/431, 443, 446/454, 456, 457, 462
See application file for complete search history.

(56) References Cited

U.S. PATENT DOCUMENTS

| | | | |
|---|---|---|---|
| 962,308 A | 6/1910 | Burnett | |
| 3,746,112 A * | 7/1973 | Ilon | 180/6.2 |
| 3,789,947 A | 2/1974 | Blumrich | |
| D294,278 S | 2/1988 | Ukisu | |
| 5,213,176 A * | 5/1993 | Oroku et al. | 180/168 |
| 5,383,715 A | 1/1995 | Homma et al. | |
| 6,066,026 A * | 5/2000 | Bart et al. | 446/460 |
| 6,502,657 B1 * | 1/2003 | Kerrebrock et al. | 180/218 |
| 6,668,950 B1 * | 12/2003 | Park | 180/7.1 |
| 6,860,346 B1 * | 3/2005 | Burt et al. | 180/8.2 |
| 2002/0011368 A1 * | 1/2002 | Berg | 180/218 |
| 2005/0072616 A1 * | 4/2005 | Pal | 180/218 |

\* cited by examiner

*Primary Examiner*—Kevin Hurley

(57) ABSTRACT

A wireless remote controlled rover (100) having a circular outer boundary when viewed in profile, comprising an elongated round-profile frame (20) outfitted with a pair of omnidirectional wheels (101L,R), rotatable in opposite directions by a drive system (50), for steering. Each of omnidirectional wheels (101L,R) comprises a set of secondary wheels (150L,R) akin to large diameter hollow flexible shafts arcuately bent and distributed in a polar array about corresponding hubs (82L,R). The secondary wheels (150L, R) are rotatable by the drive system (50) for longitudinal thrust of rover (100). A user controls the steering and thrust actions via remote control (166) for navigation and to compensate for incidental inertial rolling/careening effects of the two-wheel round-profile rover (100) while in motion. An onboard intelligent electronic processing unit (33) uses sensory feedback for autopilot, or assistive navigation, during certain scenarios such as performing user-requested optimum stopping maneuvers.

12 Claims, 9 Drawing Sheets

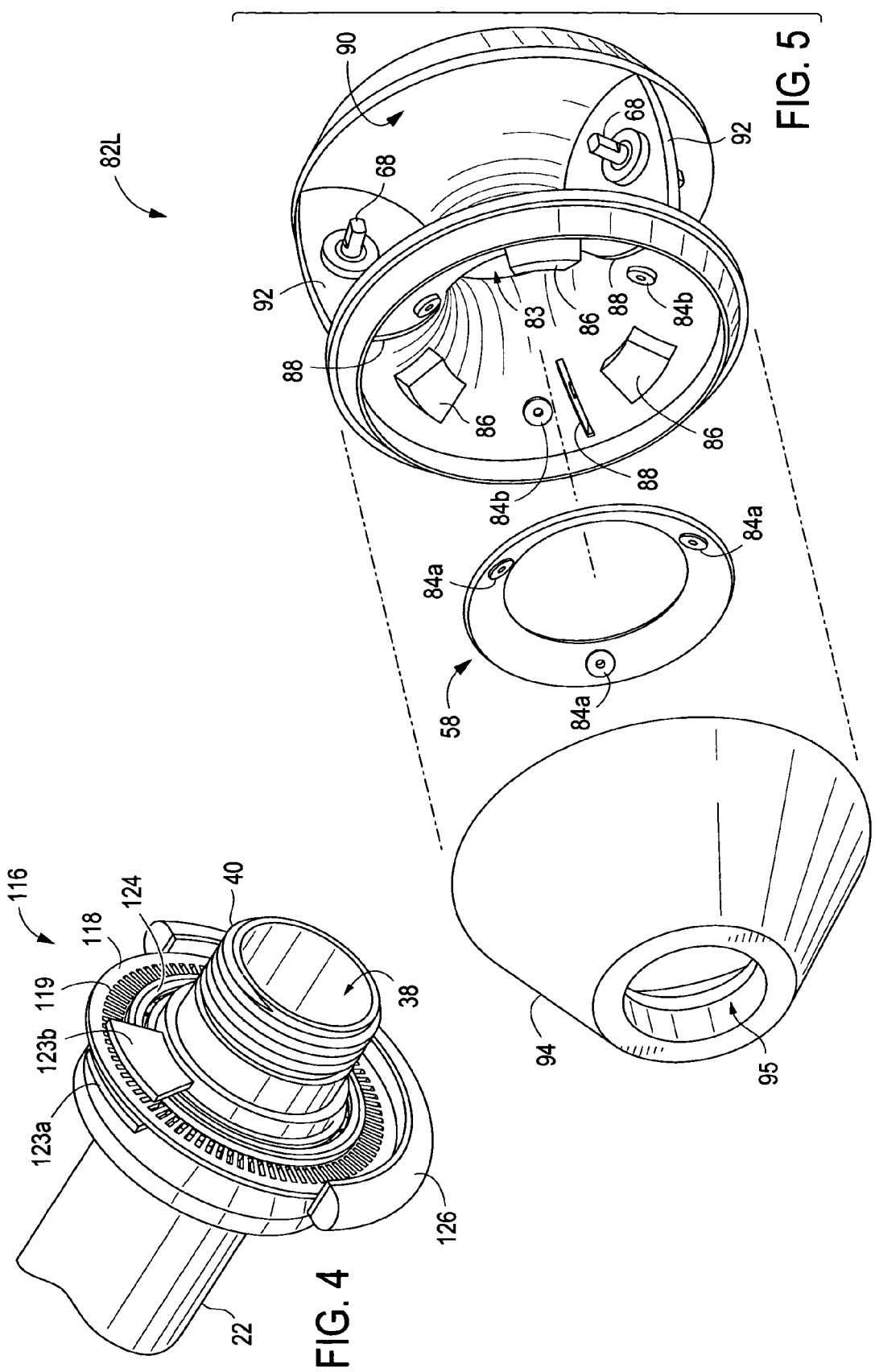

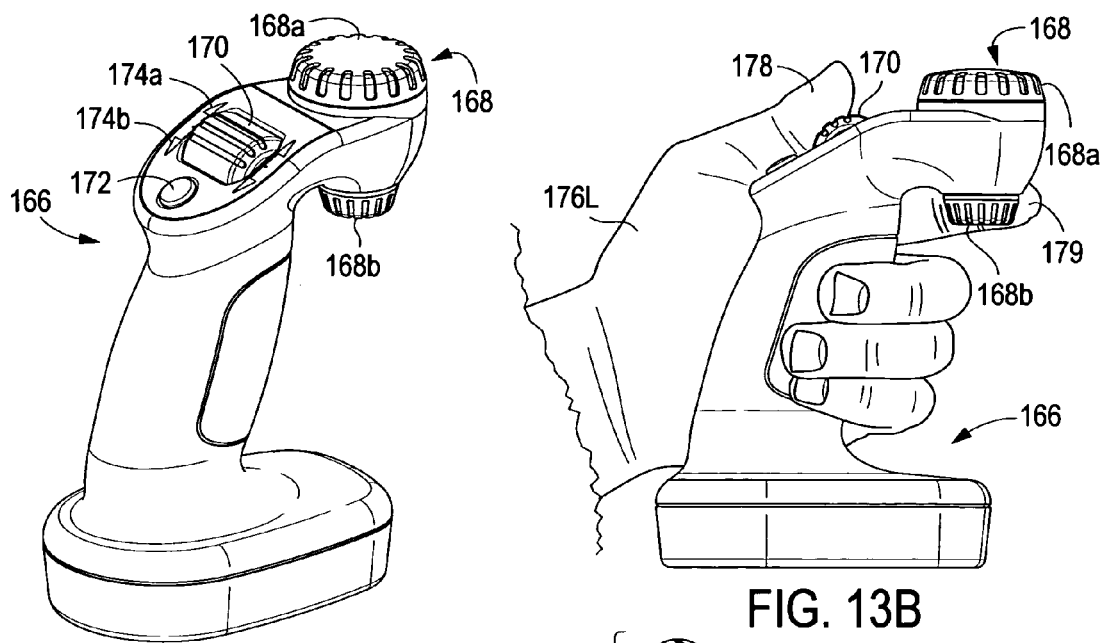
FIG. 13A
FIG. 13B
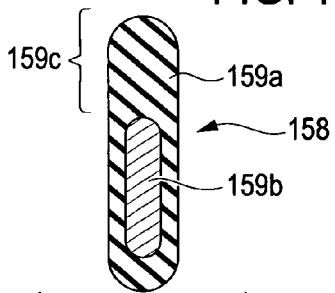
FIG. 11
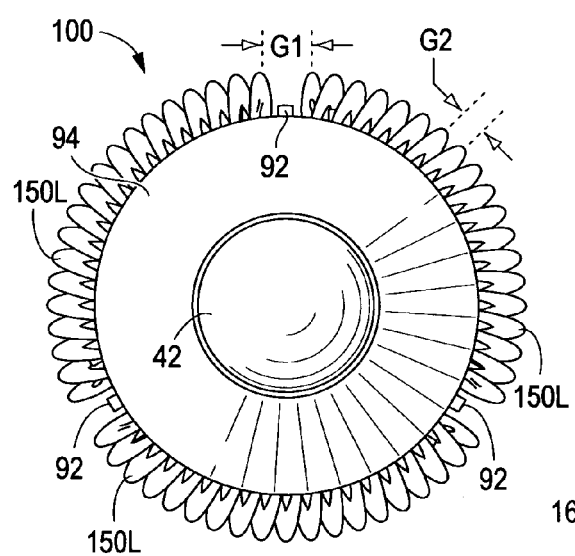
FIG. 8
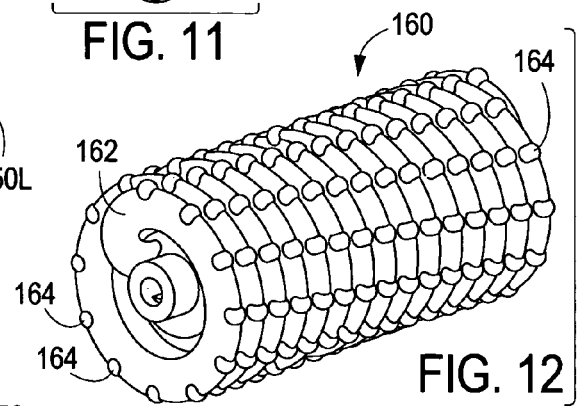
FIG. 12
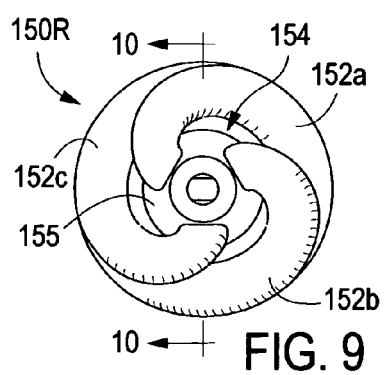
FIG. 9
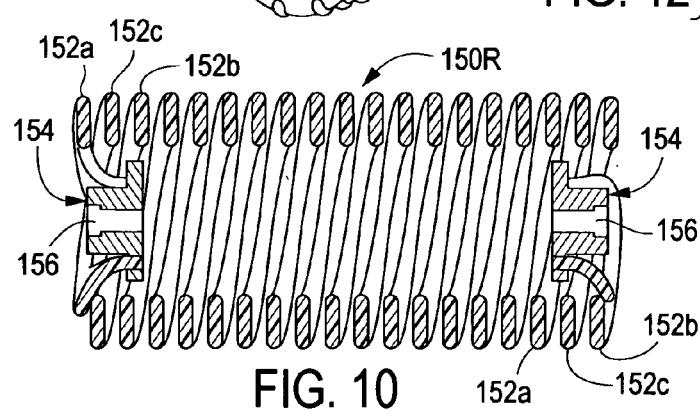
FIG. 10

SINGLE AXLE WIRELESS REMOTE CONTROLLED ROVER WITH OMNIDIRECTIONAL WHEELS

CROSS-REFERENCE TO RELATED APPLICATIONS

Not Applicable

FEDERALLY SPONSORED RESEARCH

Not Applicable

SEQUENCE LISTING PROGRAM

Not Applicable

BACKGROUND OF THE INVENTION

The present invention relates to remote controlled vehicles, particularly to uncrewed rovers, terrain probing exploration vehicles, and recreational toy stunt vehicles, and specifically to a two-wheeled rover with a pair of omnidirectional wheels coaxially rotatable, having actively driven secondary wheels and a dynamic stability electronic system.

Remote controlled vehicles have been introduced in the past for terrain exploration and reconnaissance missions. A factor of importance, pertinent to those scenarios, is the proper design of the vehicles enabling them to negotiate unpredictable terrain morphology.

Carriage-on-wheels type of rovers have an inherent vulnerability, in that, unforeseen terrain factors may cause the rover to tumble, or tip to its side, loosing wheel ground contact and be unable to recover. Combinations of design parameters such as a low center of gravity, long wheelbase and larger track width are usually applied to minimize the tipping tendency. However these parameters are also competing against favorable wheel clearance and overall dimensional compactness; meaning that the vehicle body needs to be lower to the ground and to occupy a larger area for added stability.

Several concepts have been brought forth in robotic applications such as involving multi-limbed, multi-symmetrical vehicles attempting to address issues of balanced, tip-resistant, orientation agnostic designs. Multi-limbed robotic exploration vehicles, although conceptually aspiring to simple geometric shapes, tend to materialize as mechanically and electronically complex structures of low speed potential.

Accordingly it would be beneficial to have a high speed, remote controlled, structurally compact, orientation agnostic, exploration rover that can be handled relatively carelessly with minimal concern of it loosing traction, or becoming stranded by tipping over, or not being able to maneuver between narrow passages.

On the recreational aspect, numerous embodiments of radio controlled (r/c) surface roving toy and hobby vehicles have been introduced in the past. Often these toy vehicles are scaled-down incarnations of real life transportation equivalents. For example a two wheel r/c toy is usually a miniature motorcycle. Similarly a four wheel r/c toy is often a scaled-down version of a car, a truck and the like. Furthermore, since transportation vehicles are intended for general public use, their control and navigational behavior requires relatively low skill levels; attainable by most people. Consequently this type of r/c toys offer a limited sense of accomplishment to a user since the entertainment factor is constrained mostly to magnitudes of speed and visual thematic variations (such as colors and decorative ornamentation appealing to human imagination).

In other occasions of prior art, creative variations of surface roving r/c toy vehicles have been introduced, attempting to improve the amusement factor, by use of mechanical adaptations for performing various stunt maneuvers. For example some toy vehicles were designed to be invertible, others were adapted for spinning in place, yet others have adaptations for tumbling, or performing wheelies, and so on. However, the recreational value of these toy stunt vehicles lies in the assumption that a human being will become amused by self-inflicted actions (initiating a stunt maneuver and then watching it unfold). A user will, arguably, lose interest sooner when handling a device that performs repeatedly a staged action, instead of handling a device that imposes spontaneous interaction, adaptation, and participation with actual physical and environmental factors.

Accordingly it would be beneficial to have an educational surface roving r/c toy vehicle designed with an inherent instability (such as having a round profile prone to involuntary free rolling) that the user would be called to manually compensate and thus be continuously exposed to a plurality of unpredictable, spontaneous (non-staged) environmental factors including gravity, inertial forces, wind factors and ground surface morphology, that dynamically affect the motion of the vehicle itself and the navigation becomes a physical intuition challenge in its own right.

SUMMARY OF THE INVENTION

Briefly stated, the present invention introduces a surface roving vehicle which is remote controlled and features a pair of omnidirectional wheels mounted on a single axle. This rover, while in motion, has only two points of contact with the ground and it has a round profile; by virtue of being simply a pair of wheels on an axle.

The present rover has both axial and planar symmetry about the center of its axle and about a perpendicular plane to the middle of its axle respectively, and therefore enjoys the advantage of having no sides (to tip over) and it does not require an up-down (or similar) orientation in order for its wheels to remain in contact with the ground. Consequently, this arrangement enables the present rover to be stable only in the longitudinal direction of its axle, whereas it can freely roll (and thus not stable) in the traverse direction of its axle.

It is possible to balance the free-roll careening tendency and further navigate the present rover on a desired path by having direct control of two motion factors: Firstly, the ability to steer by using onboard motors for rotating the omnidirectional wheels in opposite directions. Secondly, the ability to speed in the longitudinal direction by virtue of the omnidirectional wheels, having actively driven (by onboard motors) secondary wheels distributed around their perimeter, allowing the rover to translate along its longitudinal axis.

An advantage of the present invention, particularly in a recreational context, is the challenge it poses to the skill, physical intuition, and coordination of the human operator attempting to tackle the complexity of motion in view of the free-rolling/careening effect (due to having only two points of contacts with the ground).

The present invention rover also includes advanced dynamic stability circuitry that communicates with onboard orientation sensors and can act as a navigation assistant (autopilot) upon user's request. Particularly, the dynamic stability circuitry is programmed with intelligent algorithms, and controls the onboard motors, to perform optimum stopping maneuvers (on behalf of the user) when the user presses a stop button on the remote control unit.

In other embodiments of the present invention (such as those pertinent to terrain probing and exploration functions), the dynamic stability circuitry has a more active role continuously handling the low level detailed aspects of navigation and balance (including compensation for the free-roll/careening effect) and the user handles only higher level functions such as direction and speed. The stability circuitry (in place of the user) is in direct control of the onboard motors and uses feedback from the onboard sensors to automatically find an optimum combination of inertial roll, steering and thrust that will satisfy the direction and speed requested by the user.

DRAWINGS—BRIEF DESCRIPTION OF THE FIGURES

FIG. 4 is a perspective close-up view of an optomechanical roll sensor.

FIG. 5 is an exploded perspective view of a left hub of the preferred embodiment.

FIG. 8 is a planar profile view of the preferred embodiment.

FIG. 9 is a planar profile view of a flexible shaft wheel.

FIG. 10 is a cross sectional view of the flexible shaft wheel along lines 10—10 from FIG. 9.

FIG. 11 is a cross sectional slice of an alternate flexible shaft wheel featuring a resilient portion and an elastomeric portion.

FIG. 12 is a perspective view of yet another embodiment of a flexible shaft wheel having peripheral ground-traction features FIG. 13A is a perspective view of an exemplary remote control unit of the present invention.

FIG. 13B is a planar view of the remote control unit of FIG. 13A as held by a user.

DETAILED DESCRIPTION OF THE INVENTION

Figure 1:
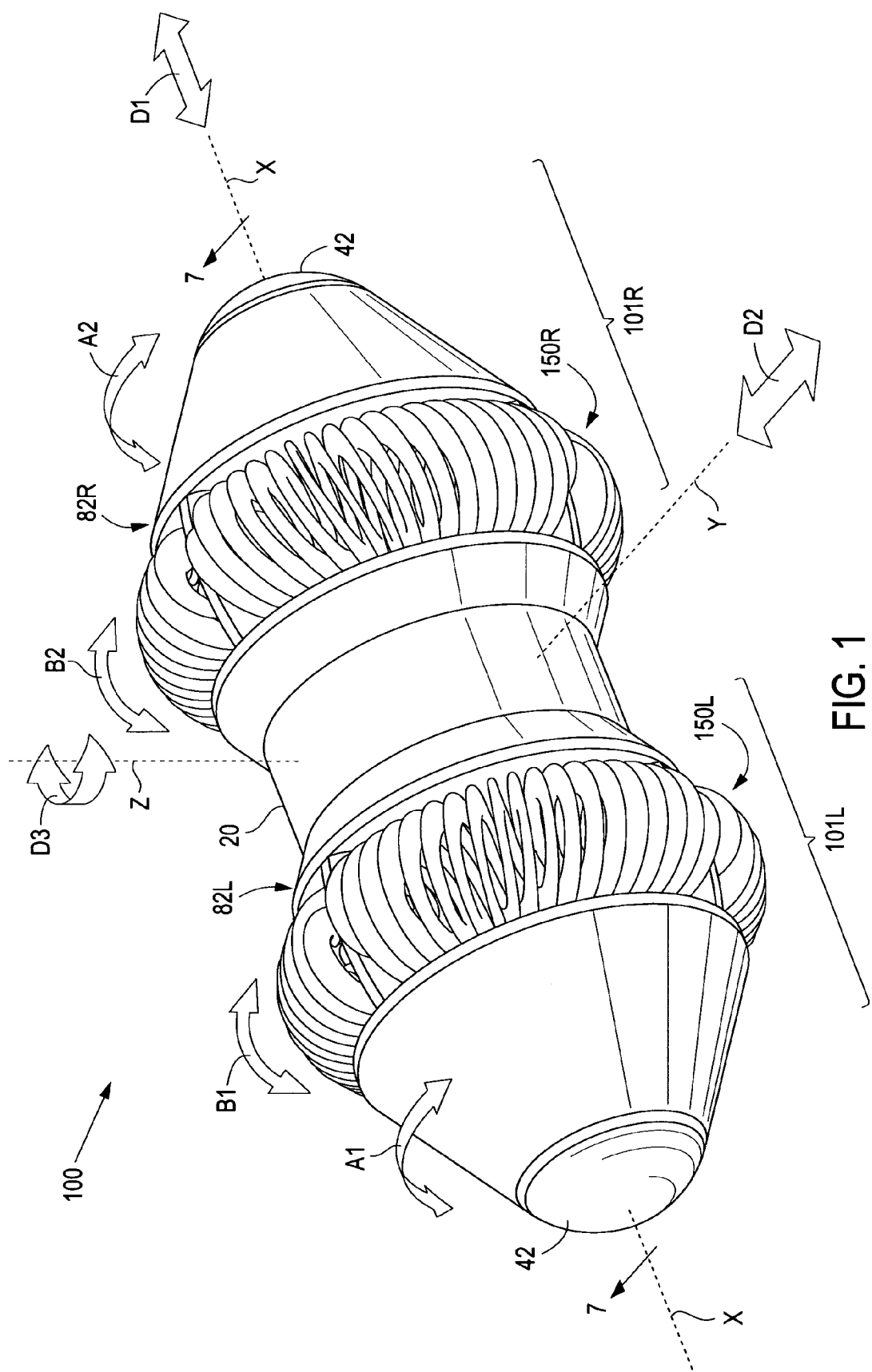
FIG. 1 is a perspective view of a preferred embodiment of the present invention.

The invention will next be described with respect to the figures. The use of the words "left" and "right" denote the position of an element within a figure relative to the left or right sides of the drawing page. The figures are intended to be illustrative rather than limiting. Numerous further variations, changes and substitutions will occur to those skilled in the art without departing from the spirit of the invention.

FIG. 1 is a summary perspective view of a preferred embodiment of the present invention rover 100 in a complete, assembled, functional form. Rover 100 is comprised by a left and a right omnidirectional wheel 101L and 101R respectively and mounted on each side of a frame 20. Wheels 101L,R share a common longitudinal axis X and can rotate individually as indicated by arrows A1 and A2. The rotation of wheels 101L,R enables a user to steer the rover 100 changing its direction. For example when wheel 100L rotates in one direction and wheel 101R rotates in the opposite direction then the rover 100 will turn about a vertical axis Z; as indicated by arrow D3.

Also, as seen FIG. 1, each of omnidirectional wheels 101L,R comprises a set of three secondary toroidal wheels 150L and 150R respectively. Toroidal wheels 150L,R are distributed in a polar array around the perimeter of omnidirectional wheels 101L,R. Toroidal wheels 150L,R of the preferred embodiment are cylindrical large diameter hollow flexible shafts (as discussed later in FIGS. 9–12), simplified to resemble coils bent to an arc and driven to rotate flexibly as indicated by arrows B1 and B2; so as to provide a constant velocity anywhere on their outer perimeter. Consequently, when toroidal wheels 150L,R rotate synchronously, the rover 100 moves along the longitudinal axis X in either direction as indicated by arrow D1.

A user of the rover 100 has direct control of two motion factors, namely i) the linear motion as shown by arrow D1 and ii) the turning motion as shown by arrow D3. Furthermore, rover 100, being substantially of round profile (and as discussed later in FIG. 8) will also have an inertial tendency to careen (roll freely) as indicated by arrow D2 and follow a path along an axis Y perpendicular to the longitudinal axis X. Thus, the careening (free rolling) effect constitutes a third motion factor and can only be controlled indirectly by judicious combination of the previously mentioned two direct motion factors. Also, the careening effect depends on various parameters such as inertia due to change of direction, or due to gravity forces depending on incline, or imperfections of the surface where rover 100 is driven. This behavior of having two directly controlled motion factors and a third, unpredictable, free-rolling factor is done so by design so as to challenge the skill and coordination of the user.

Although each set of toroidal wheels 150L,R is shown in FIG. 1 with three individual wheels this should not be construed as a limiting factor since it is possible to have arrays of less than or more than three secondary wheels on each of omnidirectional wheels 101L,R. Also, in the preferred embodiment the sets of toroidal wheels 150L,R may be identical or a mirror image of each other such as for example the coils of toroidal wheels 150R may have reverse twist compared to the coils of toroidal wheels 150L as seen in FIG. 1.

Figure 2:
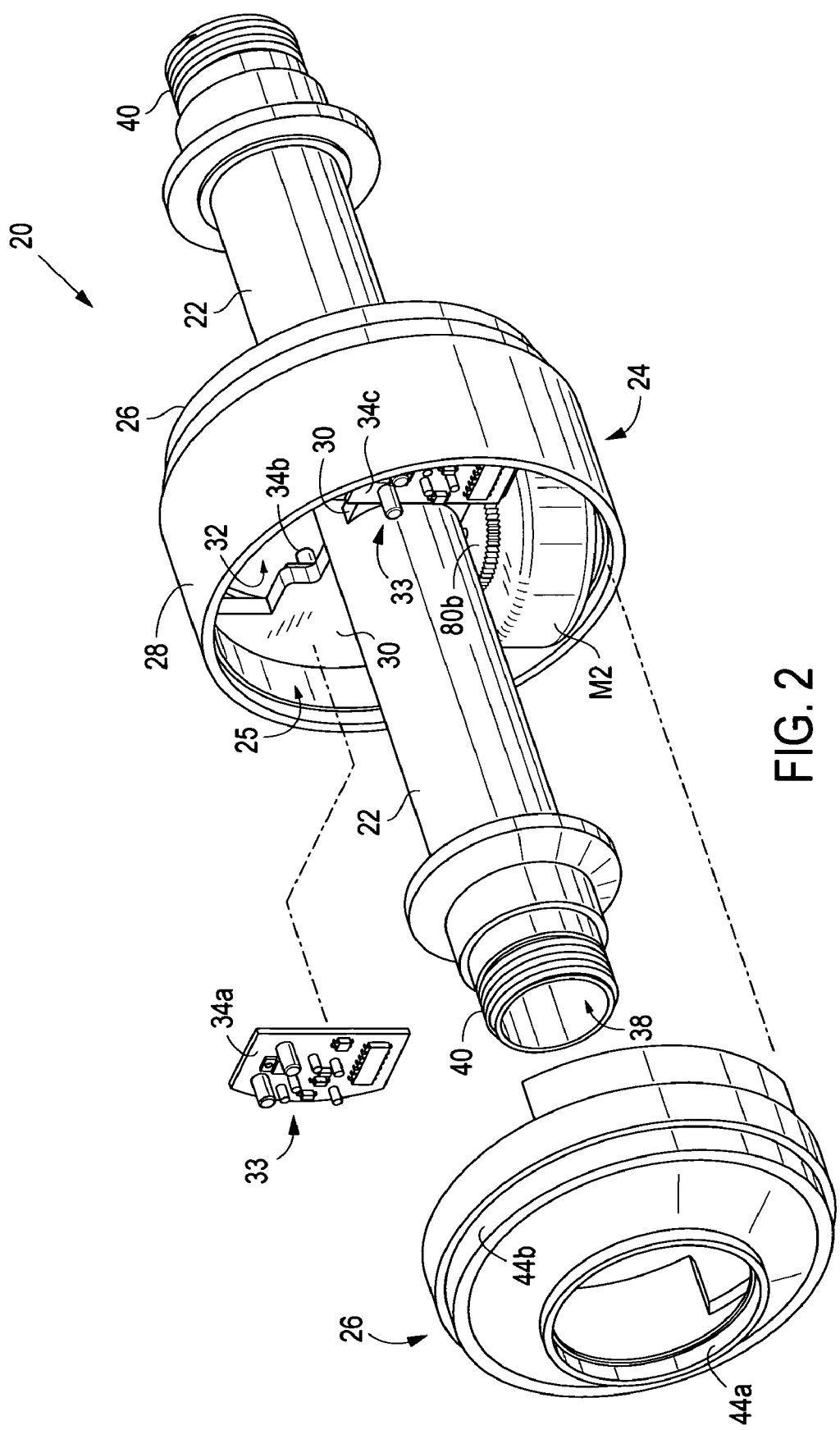
FIG. 2 is a perspective view illustrating, in isolation, a frame, axle and motor-housing of the preferred embodiment

Now, in reference to FIG. 2, a perspective view of the frame 20 is shown and discussed in isolation from the rest of the components of rover 100 for illustrative purposes. As seen in FIG. 2 the frame 20 comprises a tubular axle 22 having a hollow center that forms a cylindrical battery compartment cavity 38. Axle 22 has a pair of threaded ends 40 that receive a pair of threaded caps 42 (seen in FIG. 1) to close-off cavity 38. A cylindrical housing 24 is situated midways on axle 22 and comprises an open ended tubular shell 28 and a pair of housing caps 26 fitted on each end of shell 28 to define an enclosed volume 25. Tubular shell 28 is secured on axle 22 by a pair of divider walls 30 separating the enclosed volume 25 into two substantially equal parts. Divider walls 30 are roughly quarter-disc shaped and diametrically opposed leaving a pair of quarter openings 32 shaped to securely seat a pair of drive motors M1 and M2 so as to be enclosed within housing 24 (the top drive motor M1 is not shown in FIG. 2). Divider walls 30 may also be thought of as the second and fourth quadrants of a solid disc with the first and third quadrants being cut out to fit the drive motors M1 and M2.

Housing 24 further encloses intelligent electronic circuitry serving as a processing unit 33 which may be spread out (depending on complexity) on a number of printed circuit boards (PCB) such as PCBs 34a,b,c and d placed on either side of divider walls 30 (the PCB 34d is not visible in FIG. 2). Although four PCBs are suggested in FIG. 2, less than four may be used or more than four may be stacked within housing 24 depending on complexity.

Figure 3:
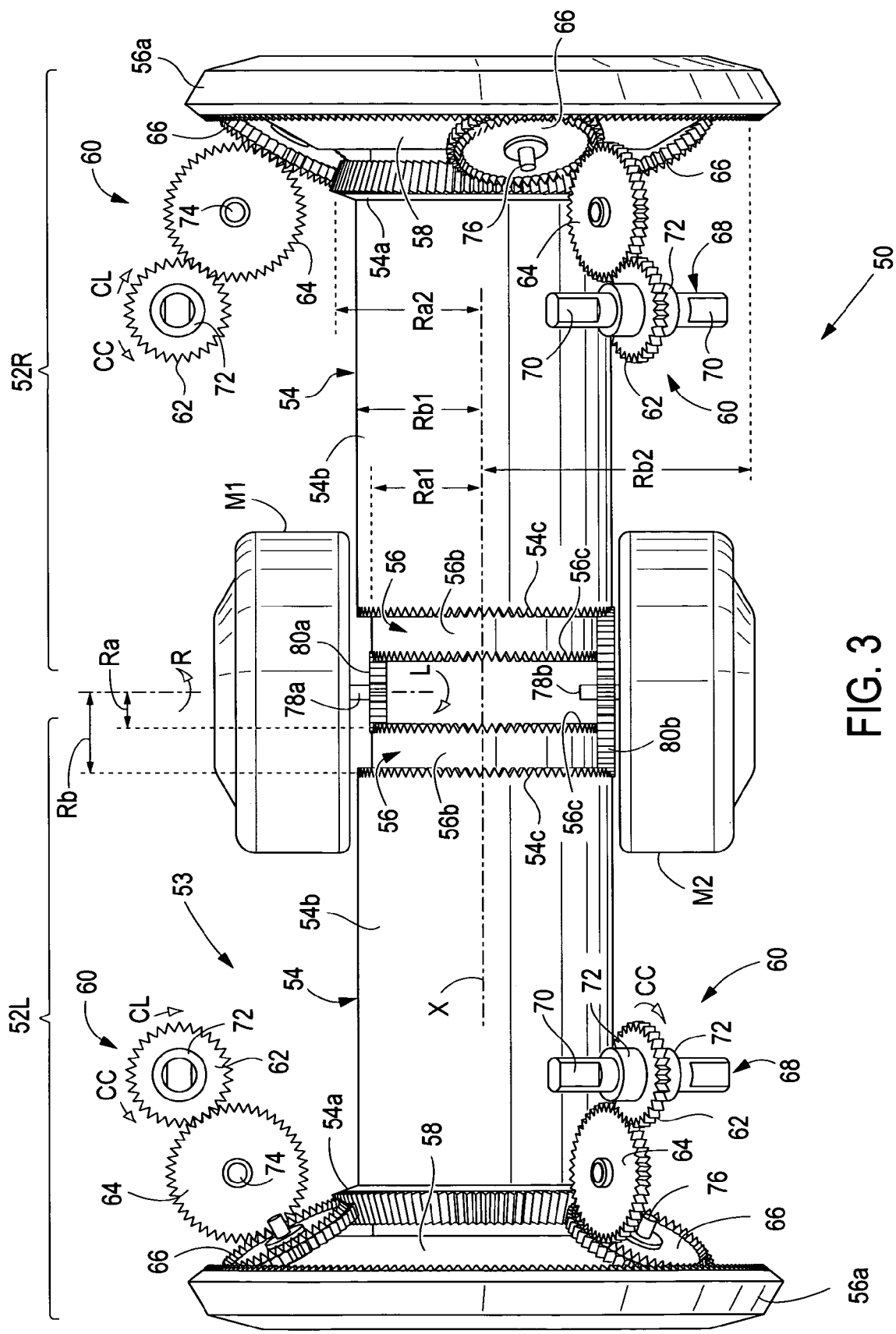
FIG. 3 is a planar view depicting, in isolation, a wireless remote controlled drive system of the preferred embodiment.

Moving on to FIG. 3, a perspective view is shown of a wireless remote controlled drive system 50 of the present invention isolated from the rest of the components of rover 100. Drive system 50 includes the PCBs 34a–d (omitted from FIG. 3 to avoid illustration clutter but shown in FIG. 2) and the drive motors M1 and M2 which were previously mentioned in reference to FIG. 2.

In the preferred embodiment, drive system 50 further comprises a left drivetrain 52L situated on the left of drive motors M1 and M2 and responsible for rotating the left omnidirectional wheel 101L and a right drivetrain 52R situated on the right of drive motors M1 and M2 and responsible for rotating the right omnidirectional wheel 101R. Each of drivetrains 52L,R has a planetary gearing system 53 comprising a sun gear 54, a ring gear 56, a number of planetary gears 66 (three planetary gears 66 are used in the preferred embodiment) and a planetary gear carrier ring 58. The sun gears 54 (of both drivetrains 52L,R) have a sun gear portion 54a on one end, a tubular shaft portion 54b in the middle, and a geared-end portion 54c on the other end. Similarly, ring gears 56 have a ring gear portion 56a on one end, a tubular shaft portion 56b in the middle, and a geared-end portion 56c on the other end. Tubular portions 56b of ring gears 56 are concentric to, and rotate within, tubular portions 54b of sun gears 54 about the longitudinal axis X. Each of planetary gears 66 has a shaft 76 that is rotatably suspended within corresponding holes 84a of planetary carrier ring 58 (as best seen later in FIG. 5) so that planetary gears 66 are in a polar array and mechanically connecting ring gear portions 56a to sun gear portions 54a. Drive motor M1 has a shaft 78A fitted with a drive motor gear 80a engaging both ring gears 56 (at the geared-end portions 56c). Similarly, drive motor M2 has a shaft 78B fitted with a drive motor gear 80b engaging both sun gears 54 (at the geared-end portions 54c).

Each of drivetrains 52L,R also includes a number of spindle transmissions 60 corresponding to the number of planetary gears 66 and each spindle transmission 60 comprises a spindle 68 having keyed ends 70, a spindle output gear 62, a pair of spindle bearings 72 on either side of the output gear 62, and a connecting gear 64. Each connecting gear 64 engages a corresponding one of planetary gears 66 to the output gear 62 and has a shaft 74.

A person skilled in the art will recognize the planetary gearing system 53 as a simple differential mechanism. The properties of such differential mechanisms are advantageous in the present invention in the sense that when the sun gear portions 54a and the ring gear portions 56a are rotating in opposite directions with the same circumferential velocity then the planetary gears 66 spin in place about their shafts 76 on planetary carrier rings 58 (without revolving around axis X) and therefore cause pure rotation of the spindles 68. Conversely, when the sun gear portions 54a and the ring gear portions 56a are rotating in the same direction with the same circumferential velocity then the planetary gears 66 have a zero spin about their shafts 76 but they revolve about axis X and also cause the planetary carrier rings 58 to revolve about axis X; and as a matter of fact the entire drivetrain 52L (or 52R) revolves in unison, as a single piece, purely about axis X. Other combinations of circumferential velocities between the ring gear and sun gear portions 54a and 56a will cause hybrid scenarios of the above mentioned pure conditions.

The left and right drivetrains 52L and 52R are a mirror image of each other except the fact that each of connecting gears 64 on the left drivetrain 52L engages the opposite end of its corresponding planetary gear 66; as compared to the connecting gears 64 on the right drivetrain 52R. Also, the ratio of a radius Ra to a radius Rb of motor gears 80a and 80b respectively could be selected based on equation 1

$$\frac{Rb}{Ra} = \left(\frac{Rb1}{Rb2} * \frac{Ra2}{Ra1}\right) \qquad \text{Equation 1}$$

where Ra1, Rb1, Ra2 and Rb2 are the radii of tubular shaft portions 56b and 54b, as well as sun and ring gear portions 56a and 54a respectively, so that equal magnitudes of angular velocities of shafts 78A and 78B will produce equal magnitudes of circumferential velocities on ring gear portions 56a and sun gear portions 54a respectively.

In summary of the overall drivetrain functionality, when the diametrically opposed motor gears 80a,b are both driven along the same direction R (or direction L) then the tubular shaft portions 56b and 54b rotate in opposite directions, the carrier rings 58 remain stationary and all spindles (on both left and right side) rotate in the same direction CC (or direction CL respectively). Also, when one of the motor gears (80a or 80b) is driven along one direction (R or L) while the other motor gear (80b or 80a) is driven in the exact opposite direction (L or R) then all spindles 68 have zero spin and the entire left drivetrain 52L rotates about axis X and in the opposite direction than the entire right drivetrain 52R. Furthermore, the rotation of spindles 68 can be varied in a continuum of speeds by applying equal amounts of incremental change (positive or negative) in the rotational speed of both motors M1 and M2. Conversely, the rotation of carrier rings 58 can be varied in a continuum of speeds by applying equal and opposite amounts of incremental change in the rotational speed of both motors M1 and M2.

Continuing the discussion of the wireless remote controlled drive system 50, the processing unit 33 on PCBs 34a–d serves as an electronic brain for the present invention that intelligently controls the speed of drive motors M1 and M2 in response to wireless radio signals from a user-operated remote control unit 166 (as later seen in FIGS. 13A and 13B). The processing unit 33 includes a signal processing circuitry connected to an on-vehicle antenna (not shown). The antenna may be a separate Wi-Fi antenna, or preferably the tubular shell 28 itself (or any component of the present invention rover 100) doubling its function as an antenna. Alternatively other antenna forms may be used as for example microstrip antennas integrated into the circuitry on PCBs 34a–d.

In the preferred embodiment of the present invention rover 100, the drive system 50 further includes a number of sensors. Particularly, PCBs 34a–d include micro-sensors (not shown) such as those from Freescale Semiconductor, Inc. (Austin Tex.); or Kionix, Inc. (Ithaca, N.Y.); or PNI corporation (Santa Rosa Calif.); or Honeywell International Inc (Morristown N.J.); or similar, for sensing of:

a) tilt of axis X relative to horizontal, b) direction of roll and rotational velocity of frame 20 (and thus of the entire rover 100), c) azimuth (north/south orientation of longitudinal axis X), d) distance/range of rover 100 relative to the remote control unit 166.

In some embodiments of the present invention rover 100 (depending on manufacturing complexities and cost), the processing unit 33 also receives feedback from an optomechanical roll sensor 116 (seen in FIG. 4).

The roll sensor 116 as seen in FIG. 4 is well known in the art of optomechanical sensors such as those used in computer mice, gaming joysticks and the like. The roll sensor 116 can be located on either end of axle 22 and comprises a slotted wheel 118 mounted on a bearing 124. Wheel 118 has a plurality of radial slots 119 that intermittently interrupt a pair of light beams between pairs of light receptors 120 and light emitters 122 (best seen in FIG. 7) situated on mounting brackets 123a and 123b. Roll sensor 116 also has a semicircular gravity-follower weight 126 attached on the slotted wheel 118. The weight 126 will always seek to rest at the lowest position towards the earth thus causing wheel 118 to rotate on bearing 124 as the rover 100 rolls/careens on a ground surface. Sensor 116 is connected to the processing unit 33 on PCBs 34a–d to communicate direction of roll and rotational velocity of frame 20.

Figure 6:
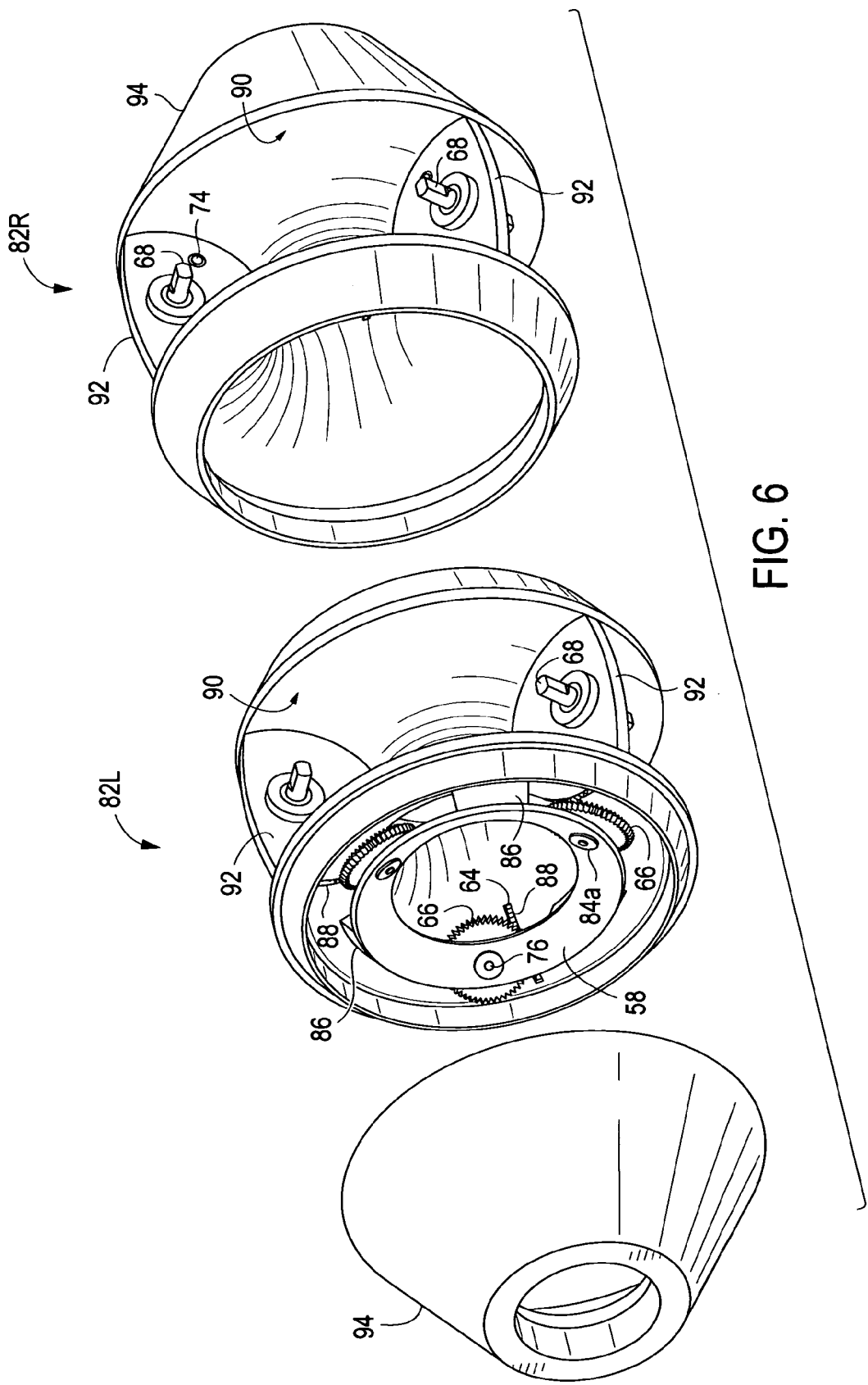
FIG. 6 is a perspective view of both a left and a right hub of the preferred embodiment.

Now in reference to FIG. 5, an exploded perspective view is shown illustrating a left hub 82L of omnidirectional wheel 101L. Hub 82L comprises a toroidal channel 90 of roughly semicircular cross-section creating a donut shaped hub opening 83 on its underside of sufficient diameter to allow shaft portion 54b to pass through without coming in contact. Channel 90 is interrupted by a set of three identical channel dividers 92 each having sufficient width to house a corresponding spindle transmission 60 while leaving spindles 68 exposed from both ends. One side (the left) of each of the channel dividers 92 has a slot opening 88 to allow the gear teeth of connecting gear 64 (not shown in FIG. 5) to be exposed. In between dividers 92, a corresponding one of left toroidal wheels 150L (shown in FIG. 1) is fitted to be driven by spindles 68 (in a manner which will become increasingly clear later in this discussion). Adjacent to slots 88, on one side, is a set of planetary-gear-shaft holes 84b corresponding to the gear-shaft holes 84a on carrier ring 58. Also adjacent to slots 88 are protrusions, or mounting features 86, integral to the underside of channel 90 serving as attachment points for securing carrier ring 58 on hub 82L; with each of planetary gears 66 rotatable within a corresponding pair of holes 84a and 84b (as seen in FIG. 6). The left side of hub 82L is closed off by a hub cone cap 94 having an opening 95 for axle 22 and cap 42.

FIG. 6 is a perspective view showing both left and right hubs 82L and 82R. Hub 82L is shown with its cone cap 94 detached to reveal the placement of carrier ring 58, planetary gears 66 and connecting gears 64. The right hub 82R is a mirror image of left hub 82L with the exception that each of the connecting gears 66 (of hub 82R) are meshing on the opposite side of their corresponding planetary gear 66 (compared to connecting gears 66 of hub 82L as shown in FIG. 5) and the mounting features 86 are located in a circumferential shifted position accordingly. Carrier rings 58 are fixedly secured on hubs 82L,R so that they act as a singe piece; and thus when the carrier rings 58 rotate then the entirety of either hub 82L,R rotates and consequently the entirety of either omnidirectional wheel 101L,R rotates.

Figure 7:
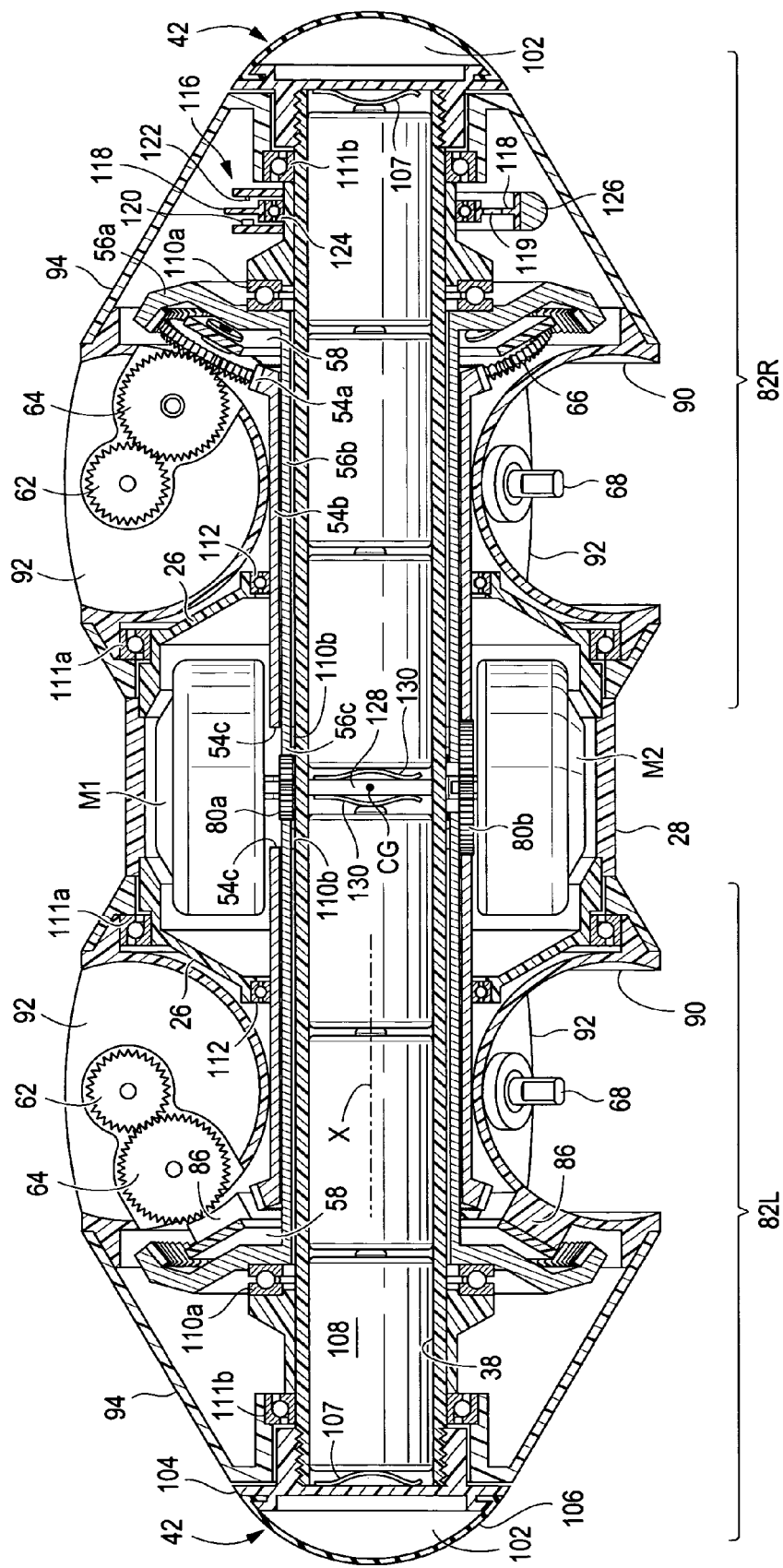
FIG. 7 is a cross sectional view of the preferred embodiment along lines 7—7 from FIG. 1

Now in reference to FIG. 7, a cross sectional view of the present invention rover 100 is shown as taken by section lines 7—7 from FIG. 1. In this view, all of the components of the preferred embodiment can be seen in their assembled form, except the PCBs 34a–d (previously seen in FIG. 2) and the toroidal wheels 150L,R (previously seen in FIG. 1). As it can be seen in FIG. 7 battery compartment cavity 38 receives a number of batteries, or power sources 108 (six are shown in FIG. 7). A divider 128 splits the cavity 38 in two chambers separating the power sources 108 in two columns. Each column of power sources 108 touches a lead 130 (of divider 128) on one end and a lead 107 (on cap 42) on the other end. The columns of power sources 108 are electrically connected in parallel in the preferred embodiment and provide electrical energy to the drive motors M1 and M2 as well as PCBs 34a–d. However, someone skilled in the art will note that a connection in-series is also possible, or that the divider 128 can be omitted, or that the first column of power sources 108 may be dedicated to one of drive motors M1 and M2 and the second column to the other of drive motors M1 and M2.

Additionally, the threaded caps 42 enable a user to access the battery compartment cavity 38 from both ends of axle 22 so as to replenish power sources 108 when needed. Threaded caps 42, comprise a rigid threaded portion 104 and a flexible, or cushioning, domed portion 106. Domed portion 106 defines a cavity 102 and serves as a bumper or cushion to absorb shock when rover 100 is driven carelessly and bumps or pushes longitudinally against obstacles in its course. Also, caps 42 form the tips, and cone caps 94 form the base, of a pyramid shape (as best seen in FIG. 1) helping to prevent any possibility of rover 100 balancing vertically with both wheels 101L,R off the ground. Hubs 82L and 82R as well as sun gears 54 and ring gears 56 are rotatably fitted in coaxial layers around axle 22. Particularly, each of tubular shaft portions 56b is placed coaxially over axle 22, on each side of housing 24, and suspended on bearings 110a and 110b. Each of tubular shaft portions 54b is placed coaxially over the tubular shaft portion 56b of the corresponding ring gear 56, and is suspended on bearing 112. Finally, each of hubs 82L and 82R is suspended on bearings 111b and 111a and has the shaft portion 54b of the corresponding sun gear 54 passing through opening 83. Bearings 111a and 112 are seated on corresponding bearing seats 44b and 44a (best seen in FIG. 2) respectively, of housing caps 26, and thus they are intimate to frame 20. Bearings 110a, 110b and 111b are seated on axle 22 and thus are also intimate to frame 20.

Now in reference to FIG. 8, a profile view of the rover 100 is shown. In this figure the right toroidal wheels 150R are aligned directly behind wheels 150L and thus hidden from view. Rover 100 preferably comprises three toroidal wheels 150L (as well as three wheels 150R) each being elastically bent (during assembly) into an arc and situated in between a pair of consecutive dividers 92; thus wheels 150L,R define a substantially circular outer boundary profile for rover 100. Dividers 92 cause the ends of toroidal wheels 150L,R to be separated by a gap G1. Furthermore, each one of bent toroidal wheels 150L,R has a coil outer pitch G2. In the preferred embodiment, gap G1 is desired to be as small as possible or better yet equal to the coil outer pitch G2. Also the symmetry and shape of hubs 82L,R as well as frame 20 and the distribution of internal components, is such that the weight of rover 100 is uniformly balanced in both radial and longitudinal directions and thus the center of gravity coincides with axis X and particularly with point CG (as best seen in FIG. 7). The round profile of the present invention rover 100 is an important deliberate feature introducing an element of unpredictable inertial roll during use, where the user's skill, physical intuition, and eye-hand coordination are put to a test.

Moving on to FIGS. 9 and 10, a profile view and a cross-sectional view respectively are shown illustrating one of the right toroidal wheels 150R (the rest of toroidal wheels 150L,R are similar in construction). The toroidal wheel 150R is a simplified cylindrical flexible shaft which, in this case, comprises three identical coils 152a, 152b and 152c. Each of coils 152a–c has an elongated flattened cross-section (as seen in FIG. 10) and is connected at each end to a rim 155 of a hub 154. More specifically, the ends of coils 152a–c are attached to, and distributed in a polar array around, rims 155 (best seen in FIG. 9). Each of hubs 154 has a keyed-opening 156 that is complementary to the keyed ends 70 of spindles 68 (shown previously in FIG. 3).

During assembly, each of the toroidal wheels 150L and 150R are placed within channel 90 of hubs 82L,R and is elastically deflected so that each end receives a spindle 68 into the keyed-opening 156 of the corresponding hub 154. The inherent tendency of the deflected coils 152a–c to return to their natural position generates an internal force that pushes the coils firmly against spindles 68 and thus keeping wheels 150L,R from detaching during normal use. However, wheels 150L,R can be easily detached by a user and replaced if needed by simply forcing the ends of toroidal wheels 150L,R out of their spindles 68. Although the wheel 150R shown in FIGS. 9 and 10 has three coils 152a–c, more than three or less than three coils may be used. Also, other embodiments of coils 152a–c are possible that have different cross sectional shapes, such as (but not limited to) circular, square, elliptic and the like. Coils 152a–c are resilient (spring-like) but have sufficient stiffness so that wheels 150L,R exhibit minimal deflection due to the weight of rover 100, or due to acceleration/deceleration forces as well as bumps encountered on the terrain. In other words the toroidal wheels are so stiff that any deflection during normal use will not cause them to come in contact with the surface of channel 90 except in the most severe circumstances.

Furthermore, a person skilled in the art would point out that flexible shaft drives, are meant to be quite efficient (nearly 90–95% efficiency) and thus one of the desirable characteristics is to have the least possible internal friction for minimum loss of rotational energy. Consequently, the materials chosen for the coils 152a–c of the present invention rover 100 are preferably of low internal friction so as to realize low bending stiffness (consistent with the art of flexible shaft drives) but at the same time have surface characteristics that provide enough traction so as to bestow rover 100 with a meaningful grip on a variety of terrain types.

An alternate embodiment coil 158 designed for high traction is shown in cross-section in FIG. 11. Instead of single material coils 152a–d, the coil 158 comprises two layers. Particularly, coil 158 comprises an elastomeric layer 159a, as a shell, and a resilient core 159c for added stiffness. Layer 159a also has a ground engaging outer portion 159b, with more material, so as to compensate for normal wear and be suitable for traction on a variety of terrain types.

FIG. 12 is a perspective view of another embodiment showing an alternate toroidal wheel 160 comprising a single coil 162. The coil 162 has a similar cross-sectional profile as coils 152a–c and has a plurality of traction features 164 distributed along its outer edge. Traction features 164 are preferably of elastomeric material and can be of any suitable shape (including spherical bumps as shown in FIG. 12) that is known to enhance ground traction.

Now in reference to FIGS. 13A and 13B, an exemplary remote control unit 166 is shown for wireless remote manipulation of the present invention rover 100. Unit 166 comprises a steering knob control 168 positioned to rotate on a vertical axis. Steering knob 168 has upper and lower rotary knobs 168A and 168B which are mechanically linked by sharing a common shaft and thus rotate as a single body. Lower rotary knob 168B is ergonomically located so as to be accessible by a users index finger 179 thus enabling single handed operation as seen in FIG. 13B. Upper rotary knob 168A may be used for operating the control unit 166 with both hands, as for example, with a users left hand 176L holding the unit 166 while a users right hand is used to handle steering, via the upper rotary knob 168A, or vice-versa.

In addition, unit 166 also comprises a partially exposed thrust control knob 170 rotatable about a horizontal axis and ergonomically positioned for access by a user's thumb 178. In the preferred embodiment of the present invention rover 100, the left and right hubs 82L,R are color coded so that hub 82L has one vivid color and hub 82R has another vivid color mutually contrasting so that each of hubs 82L,R can be visually referenced from a distance. Furthermore, remote control unit 166 has instructive color-coded reference surface markings 174a and 174b (shown as forward and rearward arrows in FIG. 13A) in the vicinity of thrust control knob 170. Each of markings 174a and 174b have a matching color that corresponds to each of hubs 82L and 82R respectively. This color coding arrangement acts as a visual aid, during use, so as to minimize potential confusion as to which direction the rover 100 will move in response to thrust control knob 170.

Remote control unit 166 communicates steering and thrust signals to be interpreted by the processing unit 33 of rover 100. The processing unit 33 will, in turn, regulates the rotational speed of drive motors M1 and M2 accordingly. Particularly, the thrust control knob 170 results in thrust signals that are purely affecting the rotation of spindles 68 and thus toroidal wheels 150L,R so as to drive the rover 100 in forward, or reverse, direction along longitudinal axis X. The steering knob 168 results in steering signals that are purely affecting the rotation of hubs 82L,R and thus omni-directional wheels 101L,R in opposite directions so as to turn the longitudinal axis X of rover 100.

More specifically, the processing unit 33 translates the steering signals into equal and opposite amounts of change on the rotational speed of motors M1 and M2 (such as a positive speed increment on motor M1 and a negative speed increment on motor M2, or vice-versa). Also, the processing unit 33 translates the thrust signals into equal amounts of change on the rotational speed of both motors M1 and M2 (such as a negative speed increment on both motors M1 and M2 or, conversely, a positive speed increment on both motors M1 and M2). Furthermore, when a combination of both steering and thrust signals is sent by the user, then the signals are interpreted, by the processing unit 33, so that each of motors M1 and M2 is controlled by the algebraic sum of the constituent motor speed requirements (from the steering-thrust combination signal). For example (in one of many possible scenarios):

a) if the steering aspect (of the steering-thrust combination signal) requires a positive speed increment (t1) on motor M1 and a negative speed increment (−s1) on motor M2, and b) if the thrust aspect (of the steering-thrust combination signal) requires a positive speed increment (t1) on both motors M1 and M2, c) then the processing unit 33 will perform an algebraic sum of the requirements of conditions (a) and (b) so that the speeds of motors M1 and M2 are adjusted by the amount of delta1=s1+t1 (for motor M1) and the amount of delta2=−s1+t1 (for motor M2). Furthermore, continuing the above example, if the value t1 is less than the value s1 (thus delta2=−s1+t1<0) and the motor M2 was initially at rest, then motor M2 will end up being driven in reverse (a speed of delta2=−s1+t1). If the value s1 equals the value t1 and the motor M2 was initially at rest, then motor M2 will remain at rest (since in this case delta2=−s1+t1=0) while the speed of motor M1 will be further increased by the amount of delta1=s1+t1

The remote control unit 166 further comprises an emergency stop button 172 which serves to override all other user controls, including steering and thrust control knobs 168 and 170, and sends a distress signal to rover 100; so as to initiate an automatic stop sequence. The rover 100 further comprises a dynamic stability circuitry, included in the processing unit 33, which takes over control of motors M1 and M2 upon reception of the distress signal. The stability circuitry continuously monitors feedback from the onboard sensors of rover 100 and when the user presses the emergency stop button 172 the stability circuitry takes into account parameters such as current inertial-rolling speed and direction as well as inclination of axis X relative to the true horizon and makes use of built-in intelligence to bring the rover to a stop in the shortest possible distance E1 (shown in FIG. 14).

For example, (and in reference to FIG. 14) rover 100 has a starting inertial rolling speed and direction SP1 indicated as a phase 1. The user decides that it is not possible to manually stop the vehicle in time before an obstacle is hit and thus the user presses the emergency stop button 172. Upon pressing button 172, the dynamic stability circuitry takes over and the rover 100 enters a phase 2. During phase 2, and depending on the rolling speed SP1, the rover 100 will engage into an automated first zigzag maneuver 190a. A zigzag maneuver is a pair of successive abrupt convex-angle turns in opposite directions; with each turn causing the inertial rolling speed SP1, of rover 100, to be reduced by a small amount. The degree of turning during each convex-angle turn is intelligently determined by algorithms programmed in the dynamic stability circuitry ensuring that the centrifugal forces generated will not cause rover 100 to loose traction (and/or start tumbling). Depending on the remaining speed at the end of the first maneuver 190a, further zigzag maneuvers 190b, 190c, and so on, may be applied successively (with increasing degree of turning) until a last maneuver 190n brings the vehicle to a safe speed so as to enter a phase 3. At phase 3 the rover 100 can finally turn and align its longitudinal axis X in a direction that counteracts any further rolling tendency due to the incline of the ground surface and thus reaching a dynamic rest position Q. The rover 100 will actively maintain the rest position Q (compensating for external distracting factors such as wind, ground surface vibrations, and the like) for as long as the user keeps holding the stop button 172.

Figure 14:
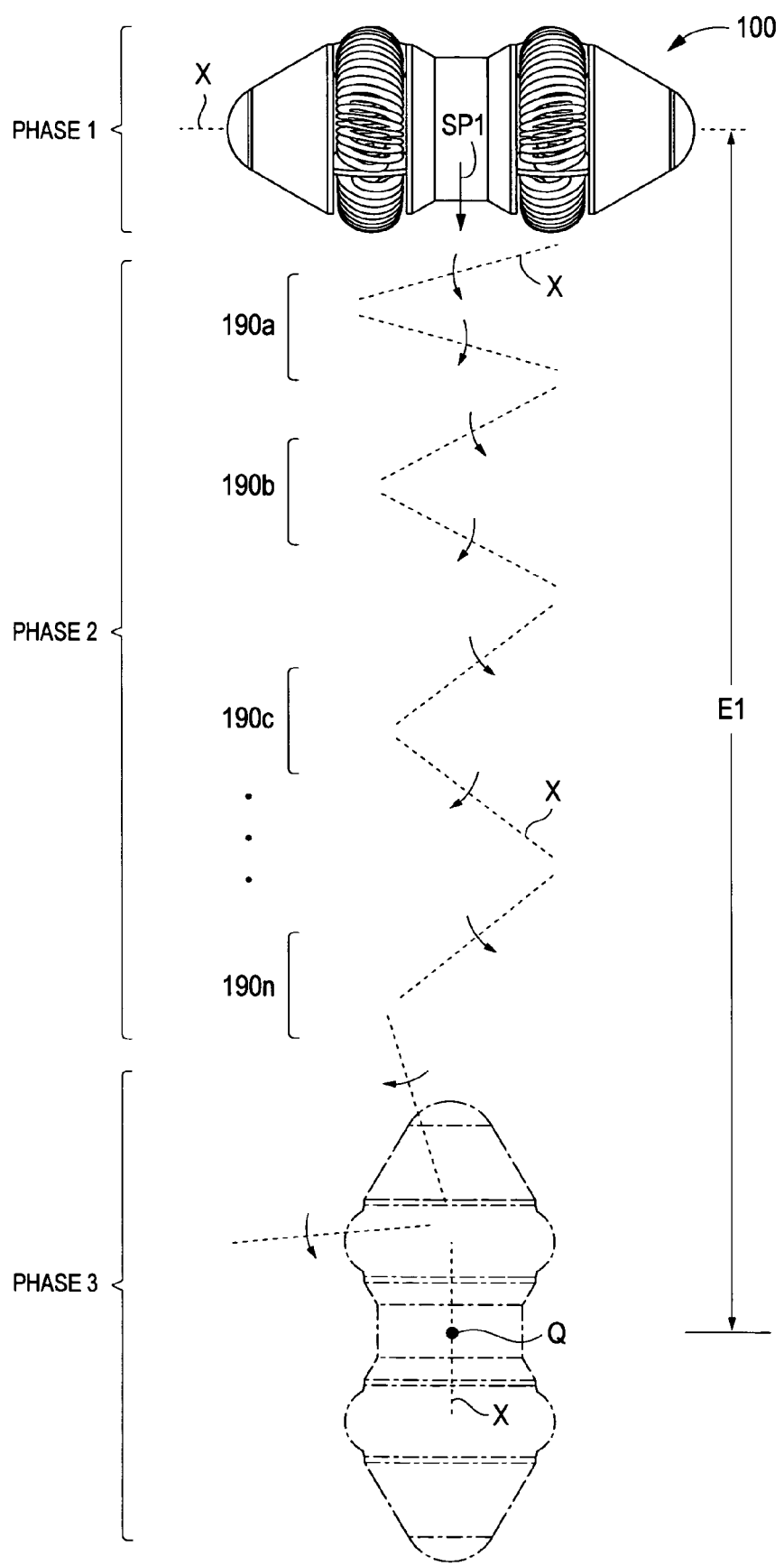
FIG. 14 is a diagrammatic plan view illustrating an automated stop-sequence showing the position of the longitudinal axis of the present invention rover during a succession of zigzag maneuvers.

Although a zigzag stopping maneuver has been shown in FIG. 14 in association with the present invention rover 100, other stopping movements are also possible. For example, in another embodiment, rover 100 utilizes a different set of algorithms causing it to follow a spiraling path (instead of zigzag), or a combination of zigzag and spiraling paths, to achieve an optimum minimal stopping distance E1.

In another embodiment of the present invention rover 100, the dynamic stability circuitry on PCBs 34a–d is also programmed with self-preservation algorithms that will initiate the stopping sequence (as described in the above example) in situations other than in response to the stop button 172. Particularly, the stop sequence may also be initiated if rover 100 senses that the energy from the power sources 108 has diminished bellow a specified threshold or when rover 100 senses that wireless communication with the remote control unit 166 is being interrupted. In those situations rover 100 will maintain the dynamic stop position and the user is then alerted by a combination of visible and audible signals from the remote control unit 166 so that rover 100 can be recovered by hand.

In yet another embodiment of the present invention rover 100, the remote control unit 166 may also allow selection of various difficulty levels (such as novice level, or advanced level and the like). For example, if the novice difficulty level is selected, then the dynamic stability circuitry on PCBs 34a–d will switch to the most advanced set of algorithms and the signals from steering control knob 168 will be interpreted as direction signals (by using feedback from the onboard sensors such as magnetic azimuth sensors/compass). The dynamic stability circuitry will become actively engaged assisting the user during navigation. The user merely points the desired direction, by turn of steering control knob 168, and the dynamic stability circuitry will automatically pilot, by application of necessary course-corrective actions, finding an optimum combination of inertial roll, steering and thrust that will satisfy the direction and speed requested by the user to guide the rover 100.

Figure 15:
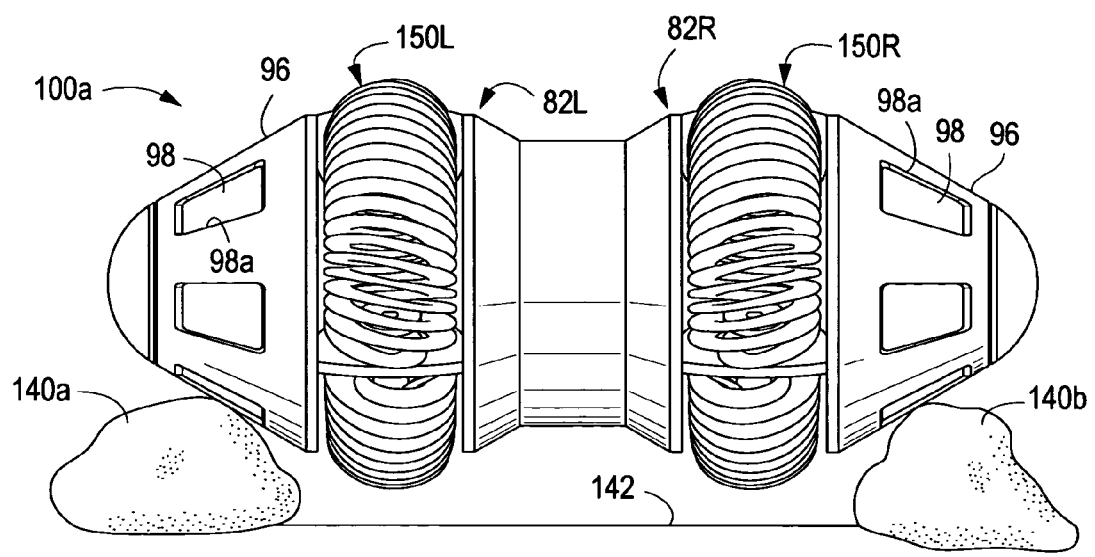
FIG. 15 is a planar view of another embodiment of the present invention featuring a variation hub having traction features on its surface.

Now in reference to FIG. 15, a planar view of an alternate embodiment rover 100a is shown comprising a variation hub cone cup 96 on each of hubs 82L and 82R. Each of cone cups 96 includes a plurality of indentations 98 providing surface variation and roughness to the cone cup 96 so as to aid traction in certain special circumstances. Particularly, in the event that rover 100a is driven on rough or obstacle ridden terrain there is possibility for a situation where rover 100a is suspended from both ends on ground objects such as masses 140a and 140b where the wheels 150L,R have both lost contact with a ground surface 142. The user is able to negotiate the situation by applying a steering action, where hubs 82L,R counter-rotate, so as to roll on masses 140a,b in opposite directions and escape the predicament. Indentations 98 include steps, or edges 98a, on the surface of cone cups 96 that help improve grip against masses 140a and 140b.

Figure 16:
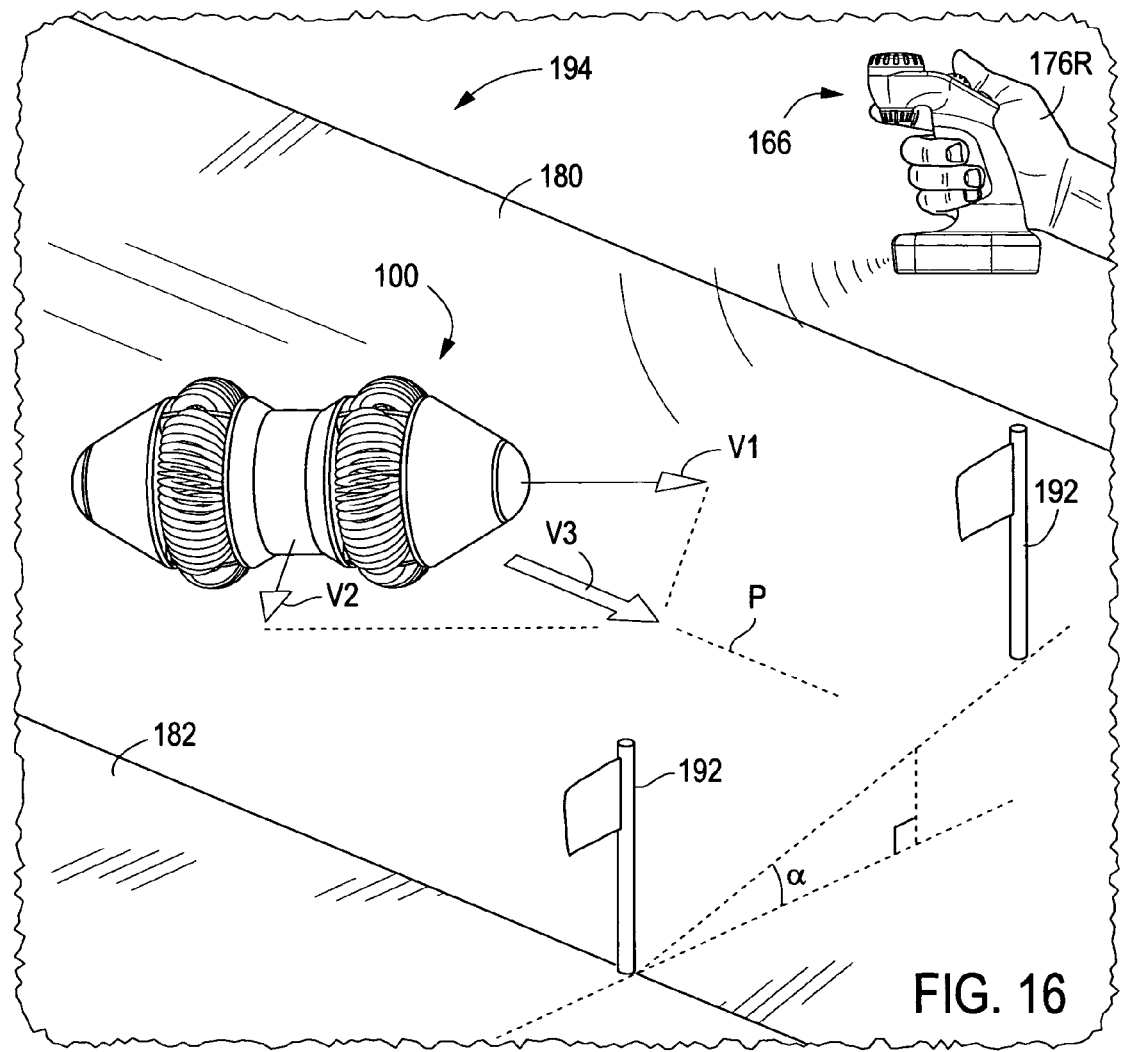
FIG. 16 is a perspective scene featuring the preferred embodiment, in motion, as guided by remote control and traveling on an incline surface.

Finally, in reference to FIG. 16, a perspective view of the present invention rover 100 is shown in operation being driven on an incline surface 180 in response to signals from the remote control unit 166 held by a user's right hand 176R. Rover 100 is designed deliberately with a capability to challenge the skill, physical intuition and coordination of a user. Rover 100 may be driven on a track 194 having various types of adjacent surfaces with varying degrees of inclination including a horizontal surface 182; where the user attempts to navigate the rover 100 precisely through sets of goals 192. The complexity and challenge of operation is particularly evident when rover 100 is driven on an incline surface where the involuntary inertial rolling aspect is also affected by the forces of gravity. Particularly, when rover 100 is driven on incline surface 180 at an angle α to the horizontal the user will have to manually determine a velocity component vector V1 (via thrust control knob 170) as well as the optimum steering orientation (handled via steering knob 168) so that when combined with an existing velocity component vector V2 (due to involuntary inertial and gravity rolling) rover 100 will have a velocity resultant vector V3 and thus follow a desired path P leading toward goals 192. As it can be seen in FIG. 16 and contrary to expectation the longitudinal axis of rover 100 and the path P of movement need not necessarily coincide.

| DRAWINGS - REFERENCE NUMERALS | |
|---|---|
| 20 | frame |
| 22 | axle |
| 24 | housing |
| 25 | volume |
| 26 | housing caps |
| 28 | tubular shell |
| 30 | divider walls |
| 32 | openings |
| 33 | processing unit |
| 34a–d | printed circuit boards (PCB) |
| M1 | first drive motor |
| M2 | second drive motor |
| 38 | battery compartment cavity |
| 40 | threaded end |
| 42 | threaded cap |
| 44a,b | bearing seat |
| 50 | wireless remote controlled drive system |
| 52L | left drivetrain |
| 52R | right drivetrain |
| 53 | planetary gearing system |
| 54 | sun gear |
| 54a | sun gear portion |
| 54b | tubular shaft portion |
| 54c | geared-end portion |
| 56 | ring gear |
| 56a | ring gear portion |
| 56b | tubular shaft portion |
| 56c | geared-end portion |
| 58 | planetary gear carrier ring |
| 60 | spindle transmission |
| 62 | spindle output gear |
| 64 | connecting gear |
| 66 | planetary gear |
| 68 | spindle |
| 70 | keyed end |
| 72 | spindle bearing |
| 74 | connecting-gear shaft |
| 76 | planetary gear shaft |
| 78a,b | shaft |
| 80a,b | drive motor gear |
| 82L | left hub |
| 82R | right hub |
| 83 | opening |
| 84a,b | planetary-gear-shaft holes |
| 86 | mounting features |
| 88 | slot openings |
| 90 | toroidal channel |
| 92 | channel dividers |
| 94 | hub cone cap |
| 95 | opening |
| 96 | hub cone cup |
| 98 | indentations |
| 98a | edges |
| 100 | rover |
| 100a | rover |
| 101L | left omnidirectional wheel |
| 101R | right omnidirectional wheel |
| 102 | cavity |
| 104 | threaded portion |

| -continued | |
|---|---|
| DRAWINGS - REFERENCE NUMERALS | |
| 106 | domed portion |
| 107 | leads |
| 108 | power sources |
| 110a | bearings |
| 110b | bearings |
| 111a | bearing |
| 111b | bearing |
| 112 | bearings |
| 116 | optomechanical roll sensor |
| 118 | slotted wheel |
| 119 | slots |
| 120 | light receptor |
| 122 | light emitter |
| 123a | first mounting bracket |
| 123b | second mounting bracket |
| 124 | bearing |
| 126 | gravity-follower weight |
| 128 | divider |
| 130 | leads |
| 140a,b | mass |
| 142 | ground |
| 150L | left toroidal wheels |
| 150R | right toroidal wheels |
| 152a–c | coils |
| 154 | hub |
| 155 | rim |
| 156 | keyed-opening |
| 158 | coil |
| 159a | elastomeric layer |
| 159b | ground engaging portion |
| 159c | resilient core |
| 160 | toroidal wheel |
| 162 | coil |
| 164 | traction features |
| 166 | remote control unit |
| 168 | steering knob |
| 168a | upper rotary knob |
| 168b | lower rotary knob |
| 170 | thrust control knob |
| 172 | emergency stop button |
| 174a | markings |
| 174b | markings |
| 176L | left hand |
| 176R | right hand |
| 178 | thumb |
| 179 | index finger |
| 180 | incline surface |
| 182 | horizontal surface |
| 190a | first zigzag maneuver |
| 190b | second zigzag maneuver |
| 190c | third zigzag maneuver |
| 190n | final zigzag maneuver |
| 192 | goal |
| 194 | track |
| α | angle |
| A1 | arrow |
| A2 | arrow |
| B1 | arrow |
| B2 | arrow |
| CC | direction |
| CG | center of gravity point |
| CL | direction |
| D1 | arrow |
| D2 | arrow |
| D3 | arrow |
| E1 | distance |
| G1 | gap |
| G2 | coil outer pitch |
| L | direction |
| P | path |
| Q | rest position |
| R | direction |
| Ra | radius |
| Ra1 | radius |
| Ra2 | radius |
| Rb | radius |
| Rb1 | radius |

-continued

| DRAWINGS - REFERENCE NUMERALS | |
|---|---|
| Rb2 | radius |
| SP1 | inertial rolling speed |
| V1 | velocity component vector |
| V2 | velocity component vector |
| V3 | velocity resultant vector |
| X | longitudinal axis |
| Y | axis |
| Z | axis |

What is claimed is:

1. A wireless-remote-controlled round profile axle-like rover responsive to control signals from a remote transmitter unit, comprising:
   a) a pair of ground engaging wheels all having a common central axis of rotation, each of said wheels being omnidirectional and comprising a hub rotatable about said central axis, said hub having a group of peripheral circumrotatory ground-contact elements circumferentially disposed thereof, each of said peripheral elements having a respective spin axis independent in relation to said central axis and each of said peripheral elements being fully rotatable about its own respective said spin axis, said group of peripheral elements defining a substantially circular ground-contact boundary about said central axis on each of said wheels, and
   b) a wireless remote controlled wheel drive engaging said hub and engaging said group of peripheral elements on each of said wheels and selectively distributing rotational energies among said hub and said group of peripheral elements respectively on each said wheels;
whereby said rover substantially resembles a single two-wheeled axle that can rollably careen unobstructed on a ground surface at a speed substantially orthogonal to said central axis of rotation, as well as steer by distribution of opposing rotational energies to each of said hubs, and propel linearly along said central axis by distribution of uniform rotational energies to said groups of peripheral elements of said wheels.

2. The rover of claim 1 wherein said rover is structurally confined within an imaginary cylindrical envelope defined by said central axis and the radius of said ground-contact boundary of said wheels.

3. The rover of claim 1 wherein said rover has a balanced weight distribution about said central axis of rotation and has a center of gravity substantially coinciding with said central axis of rotation.

4. The rover of claim 1 wherein said wireless remote controlled wheel drive includes mechanical or electronic constraints rendering said hubs always rotatable in opposite directions relative to each other and rendering each of said peripheral elements on both said wheels always rotatable synchronously with uniform rotational speed and direction.

5. The rover of claim 1 wherein each of said omnidirectional wheels further comprises vivid exterior indicia mutually contrasting between each of said omnidirectional wheels, whereby a human operator can use as visual reference of orientation of said rover from a distance.

6. The rover of claim 1 wherein:
   a) each of said hubs further comprises a plurality of drive spindles tangentially and rotatably disposed on the periphery of said hubs equidistantly about the hub rotation axis and receiving rotational energy from said wireless remote controlled wheel drive, and
   b) said group of peripheral elements is a plurality of cylindrical flexible shafts, each bent to a natural arc and each being endwise detachably attached between pairs of consecutive said drive spindles, said flexible shafts defining a substantially circular ground contact perimeter and serving as secondary wheels;
whereby each of said omnidirectional wheels can roll on a ground surface as well as translate laterally, at will, along the hub rotation axis relative to a ground surface.

7. The rover of claim 1 wherein said wireless remote controlled wheel drive comprises:
   a) a pair of drive motors,
   b) a drivetrain engaging said motors and receiving output rotational energies from said motors, said hubs engaging said drivetrain and receiving a first range of rotational energies, said groups of peripheral elements engaging said drivetrain and receiving a second range of rotational energies,
   c) a processing unit communicatively connected with each of said drive motors and controlling the angular velocities of said motors, said processing unit in communication with said remote transmitter unit, and
   d) a power source connected to said motors and said processing unit,
said motors, said drivetrain, and said processing unit cooperate and render said hubs always rotatable in opposite directions relative to each other and render each of said peripheral elements always rotatable synchronously with uniform angular velocities on both said wheels; whereby said processing unit interprets user signals and regulates accordingly the angular velocity of each of said motors and consequently the portions of rotational energies distributed among said hub and said group of peripheral elements respectively on each of said wheels.

8. The rover of claim 7 further comprising one or more orientation and velocity sensors communicatively connected with said processing unit and providing sensory feedback; whereby said rover is made self-aware of several orientation and velocity parameters such as longitudinal inclination as well as speed and direction of travel.

9. The rover of claim 7 further comprising:
   a) a hollow shaft having at least one open end and having said hubs rotatably disposed endwise thereof, said shaft defining an inner cylindrical chamber and having a longitudinal axis coincidental with said central axis, and
   b) at least one cap or closure lockably mounted on each said open ends of said hollow shaft,
said power source disposed within said chamber; whereby said closure allows user access to said chamber for replacement of said power source.

10. The rover of claim 9 wherein said drivetrain comprises:
   a) a pair of planetary gearing systems, each engaging with a corresponding one of said wheels, and each of said planetary gearing systems comprising:
      i) a ring gear rotatably and coaxially mounted on said shaft,
      ii) a sun gear rotatably mounted on said shaft and coaxial with said ring gear,
      iii) a plurality of planetary gears meshing with said ring gear and with said sun gear and arranged in a polar array about the central axis of said ring gear and said sun gear, and iv) a planetary gear carrier ring having said planetary gears rotatably disposed thereof and said carrier ring being fixedly secured on said hub of a corresponding one of said wheels, b) a first transmission means connecting each of said sun gears with a first of said drive motors, c) a second transmission means connecting each of said ring gears with a second of said drive motors, d) a plurality of drive spindles tangentially and rotatably disposed equidistantly on the periphery of said hubs of said wheels, and e) a plurality of spindle transmission means coupling each of said planetary gears to a respective one of said drive spindles on a corresponding said wheel;

whereby said carrier rings convey rotation on said hubs and said planetary gears convey rotation on said flexible shafts and the relative rotational speeds between the first and second of said drive motors determines the proportion of rotational energies delivered to said hub and said flexible shafts of each of said wheels.

11. A method of roving on a surface using a remote vehicle and a wireless controller, comprising:

a) providing a pair of coaxial omnidirectional wheels rotatable relative to each other about a central longitudinal axis, said wheels having hubs with peripheral roller elements, said roller elements allowing said wheels to propel laterally along their hub axis of rotation, said wheels can also roll as a whole on a surface about their hub axis of rotation, b) providing a wheel drive means for selectively rotating said hubs always in opposite directions relative to each other so as to enable directional changes of said vehicle, said wheel drive means selectively rotating said roller elements of both said wheels simultaneously with uniform rotational velocities so as to enable linear travel of said vehicle along said longitudinal axis, c) providing a transmitter unit for use remotely by a human operator, said transmitter unit comprising steering and thrust controls, d) providing a processing unit on said vehicle for interpreting input from said transmitter unit and translating said input into control signals for said wheel drive means, said processing unit translating i) steering signals into rotation of said hubs in opposite directions relative to each other so that said vehicle can change direction of travel, and ii) thrust signals into simultaneous rotation of said peripheral elements of both said wheels at uniform rotational speeds and directions so that said vehicle can travel linearly along said longitudinal axis.

12. The method of claim 11 further comprising:

a) providing sensor means on said vehicle conveying feedback input signals to said processing unit for monitoring inertial velocity, rotational velocity, axial orientation, and axial inclination, b) providing deceleration controls for said transmitter unit, said processing unit translating deceleration signals into a series of automated steering actions orchestrated by said processing unit in consultation with said sensor means, said processing unit ordering said wheel drive into successive steering maneuvers, each said maneuver being a swift steering attempt of bringing the vehicle said longitudinal axis temporarily in line with the direction of inertial roll velocity of said vehicle and then swiftly restoring said longitudinal axis to its previous orientation and each said swift steering attempt reducing the vehicle inertial velocity by a small amount and repeating until the vehicle stops completely or decelerates to a desired inertial roll velocity.

* * * * *